UNITED STATES PATENT OFFICE.

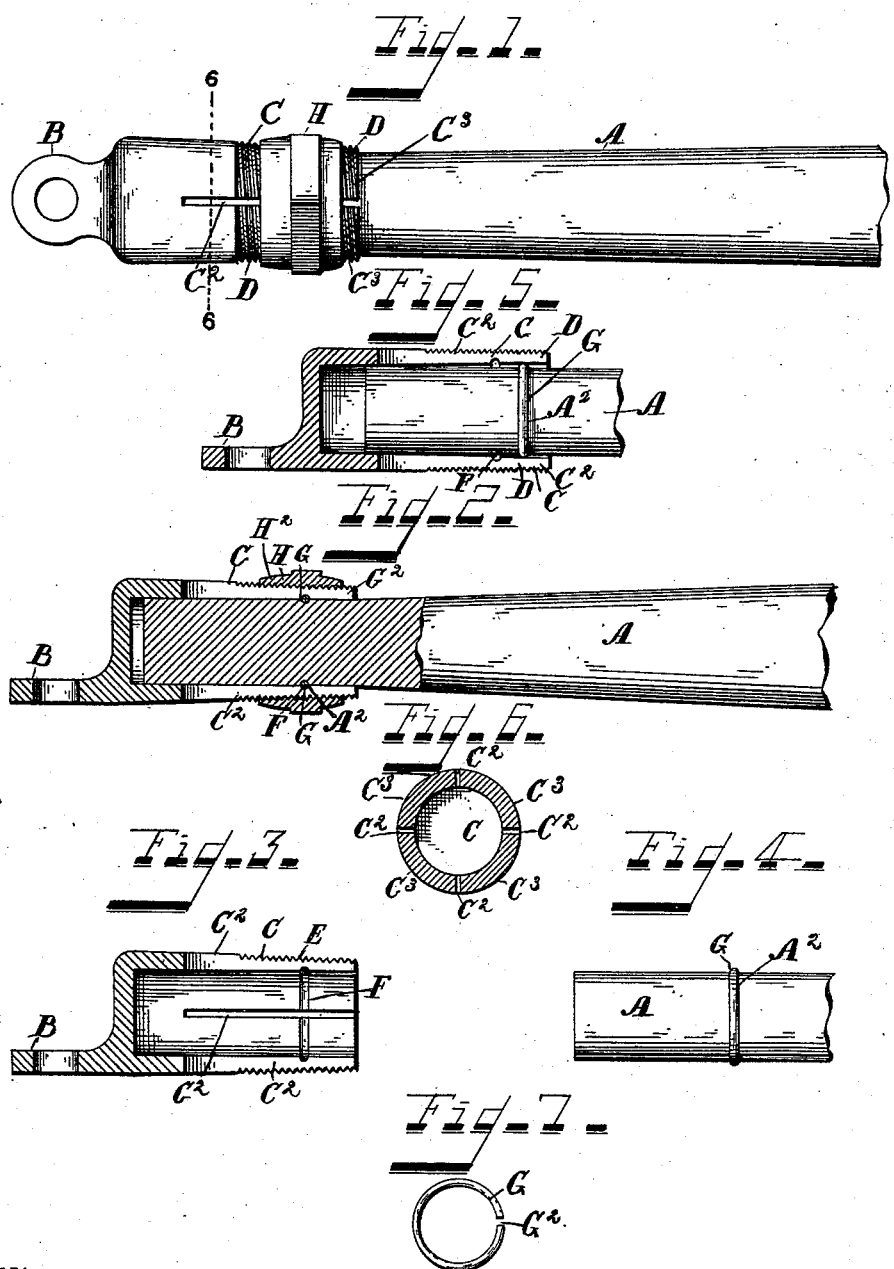

DAVID H. BUCHER, OF CARTHAGE, OHIO.

CONNECTION FOR VEHICLE-TOPS.

SPECIFICATION forming part of Letters Patent No. 572,595, dated December 8, 1896.

Application filed June 18, 1896. Serial No. 596,029. (No model.)

*To all whom it may concern:*

Be it known that I, DAVID H. BUCHER, a citizen of the United States, and a resident of the town of Carthage, in the county of Hamilton and State of Ohio, have invented a certain new and useful Connection or Coupling, of which the following is a specification.

My invention is applicable in the construction of the bows of buggy-tops of road-vehicles.

My invention, in general, combines the advantages of a spring-grasp, a removable detent, and a tightening-screw.

The invention is simple of construction and economical of manufacture. Its adaptation to the parts to be coupled is readily made. The coupling of the parts to be connected together is easily and quickly made and the disengagement of the parts is made in a like expeditious manner. When united, the parts hold together with great tenacity and are stiff and well braced, in perfect alinement, and are in close conjunction, so that there is no rattling.

In the accompanying drawings, making a part of this specification, and in which similar letters of reference indicate corresponding parts, Figure 1 is an external (side) view of a coupling embodying my invention. Fig. 2 is a vertical central longitudinal section of this coupling. Fig. 3 represents the screw-threaded sleeve in vertical central longitudinal section. Fig. 4 represents in elevation the inner piece or cylinder and the elastic ring sprung into place thereon. Fig. 5 represents a figure similar to Fig. 3, omitting the nut, but showing the elastic screw-threaded sleeve sprung apart and in the act of being adjusted onto and upon the ring and inner cylinder. Fig. 6 is a vertical cross-section of the coupling, taken in the plane of the dotted line 6 6 of Fig. 1. Fig. 7 is a side elevation of the elastic split ring employed in the combination.

A indicates the cylindrical member to which the complementary member is to be coupled. This complementary member B is provided with a sleeve or ferrule C. The latter is usually integral with the member B. The sleeve C is of metal and should be of an elastic metal for reasons shortly to be made obvious. The sleeve is split by slits $C^2$ running from the free end in the direction of the length of the ferrule, and for distance the greater portion of the same, as shown. The number of these slits $C^2$ is preferably four. The exterior of this ferrule is screw-threaded, beginning at its free end, for a considerable distance. The ferrule is tapered, being smallest in diameter at its free end and gradually growing larger toward the rear. It is the exterior of the ferrule which is tapered, the interior space being of the same diameter everywhere. The screw-thread is indicated by D and the taper by E. An annular groove F is cut in the inner side of the ferrule and in a plane at right angles to the axis of the ferrule. This groove is of course interrupted at intervals where the slits $C^2$ occur.

In the cylinder A there is present a peripheral groove $A^2$, and for this groove I provide a ring G of elastic metal. This ring is not continuous, but is cut transversely at some point, as $G^2$, in order to enable it to be enlarged, carried onto the cylinder, and sprung into the groove $A^2$, where it will tightly embrace the cylinder, as shown. The radial thickness of the ring G is greater than the depth of the groove, and the outer portion of the ring projects beyond the peripheral surface of the cylinder, thus forming an annular ridge, as shown.

In furnishing all of the needed portions of my coupling I provide a nut H, whose inner threaded surface is preferably tapered, as at $H^2$, conversely with the taper on the ferrule, as shown in Fig. 2.

In attaching the cylinder A to part B, I use the coupling as follows: The ring G is first sprung into groove $A^2$, as described. The free end of the ferrule is spread apart temporarily, the slits $C^2$ and the elasticity of the metal admitting of this. While the free end of the ferrule is thus enlarged the end of the cylinder A is introduced therein and pressed forward. The ring G passes within the fingers $C^3$ of the ferrule, as shown in Fig. 5, and the ferrule is still further advanced in relation to the cylinder until the groove F of the ferrule is over the ring. Then the fingers of the ferrule will approach one another and assume their normal position, as shown in Figs. 2, 3, and 6.

The connection between the cylinder and the ferrule is by means of the coupling-ring—a strong connection and one difficult to disengage, except by human agency lifting the ends of the fingers away from the cylinder and at the sane time drawing the cylinder from the ferrule, thus springing the ferrule off from the ring; but the addition of the nut to the connection already established confirms the connection and gives it great stiffness and prevents the connection becoming loose or shackly. The nut, when screwed on, does, by means of the tapered screw-threads, force the elastic fingers of the ferrule not only upon the cylinder, but causes them to grasp it and securely hold it. By reversing the aforementioned several operations the coupling is disengaged.

Some of the advantages of my invention are as follows: If an annular bead were to be present on the cylinder to take the place of the removable ring, this would involve casting and additional turning down, or it would involve the use of a cylinder of the original diameter of the bead, this cylinder subsequently being turned down to form the bead. Such an operation, often necessary in metal and always necessary in wood, involves a great waste of material with no corresponding advantages.

In the case of my invention a cylinder of the final size needed is secured, and a groove is cut therein. This operation is simple and cheap. Cutting a groove in the ferrule is much cheaper and easier than forming a ridge thereon. The elastic ring formed and split as described constitutes the means of lockage and union between the cylinder and ferrule.

In the drawings I have shown the part B having an eye for connection with other mechanism, but this part may be varied to suit the construction into which the part A is to enter.

In case of breakage of either of the parts A or C the ring G can be utilized over again.

I am aware that the device of placing a shell in halves or pieces upon turned rings or collars upon which a band shall have been planed (which band may have been driven or shrunk by cooling or screwed thereon) has been before used in forming collars upon cylindrical shafts in different parts of their lengths or at their ends. I am also aware that two cylindrical pieces have been united end to end by alternate annular ridges and grooves turned on said pieces and integral therewith and alternate half-annular grooves and ridges on two complementary hollow halves of a sleeve, forming, when put together, a hollow cylinder, over which a nut is screwed; but neither of such constructions is as simple or as inexpensive as mine, and such constructions differ radically from mine in principle of construction and use.

While my invention is, as stated, applicable in the construction of the bows of buggy-tops of road-vehicles, yet I wish to be understood that I do not limit its scope or application to the construction of such articles only; but, as it is obviously more widely applicable, I claim its application in the construction of other articles wherever it can be advantageously employed.

What I claim as new and of my invention, and desire to secure by Letters Patent, is—

1. In a coupling, the combination of a cylindrical member, having an annular groove $A^2$ therein, and another complementary member B, and a ferrule C made of elastic metal and united at its rear end to member B, and being divided from its free end backward by slits $C^2$, parallel to the axis of the ferrule, and an internal annular groove F therein, and an exterior thread and inclosing locking-nut, and a ring G elastic and split, and of a thickness greater than the depth of groove $A^2$, and thereby forming a ridge projecting out and beyond the peripheral surface of the cylinder, and received into the groove F of the ferrule, after the fingers thereof have been spread apart, and brought over the cylinder and sprung over the ring, substantially as and for the purposes specified.

2. In a coupling, the combination of a cylindrical member, having an annular groove $A^2$ therein, and another complementary member B, and a ferrule C made of elastic metal and united at its rear end to member B, and being divided from its free end backward by slits $C^2$, parallel to the axis of the ferrule, and an internal annular groove F therein, and an exterior thread and inclosing locking-nut, and a ring G elastic and split, and of a thickness greater than the depth of groove $A^2$, and thereby forming a ridge projecting out and beyond the peripheral surface of the cylinder, and received into the groove F of the ferrule, after the fingers thereof have been spread apart, and brought over the cylinder and sprung over the ring, the screw-threaded portion of the ferrule being tapered toward its free end and the nut conversely tapered, for approximating the several fingers of the ferrule, and causing them to tightly embrace the cylinder, substantially as and for the purposes specified.

DAVID H. BUCHER.

Attest:
WM. E. JONES,
CHAS. S. SPEER.